United States Patent [19]

Nishiwaki

[11] Patent Number: 4,508,420

[45] Date of Patent: Apr. 2, 1985

[54] OPTICAL SYSTEM

[75] Inventor: Yoshikazu Nishiwaki, Osaka, Japan

[73] Assignee: Sumitomo Electric Industries, Ltd., Osaka, Japan

[21] Appl. No.: 453,546

[22] Filed: Dec. 27, 1982

[30] Foreign Application Priority Data

Dec. 28, 1981 [JP] Japan ............................. 56-212574
Jan. 27, 1982 [JP] Japan ............................. 57-11185

[51] Int. Cl.³ .............................................. G03H 1/04
[52] U.S. Cl. ...................................... 350/3.6; 350/3.85
[58] Field of Search ..................... 350/3.6, 3.83, 3.85, 350/109, 286

[56] References Cited

U.S. PATENT DOCUMENTS

3,504,958  4/1970  Duinker et al. .................. 350/286
4,128,308  12/1978 McNaney ......................... 350/286
4,214,817  7/1980  McNaney ......................... 350/286

Primary Examiner—Bruce Y. Arnold
Attorney, Agent, or Firm—Sughrue, Mion, Zinn, Macpeak and Seas

[57] ABSTRACT

An optical system comprises a composite block made of a bonded assembly of unit glass blocks, some of which are coated with a thin film on selected surfaces to provide predetermined light transmission characteristics, lenses and a recording material. Other glass blocks are spaced apart from the composite block. A thin substrate is provided having recesses in which the respective blocks are to be fixed. The entire optical system is embedded in a transparent molding material.

16 Claims, 8 Drawing Figures

OPTICAL SYSTEM

FIELD OF THE INVENTION

The present invention relates to a small and lightweight optical system which is capable of consistent and reliable image processing by Fourier transform, video correlation or holography techniques.

BACKGROUND OF THE INVENTION

Optical systems using holography have a wide scope of application, among which is the measurement of the deformation of an object by employing such techniques as double-exposure holography or real-time holography. For this purpose, a hologram is recorded by directing an object beam (typically a laser beam reflected from the object to be measured) and a reference beam to strike a recording material at different angles. An interference pattern between the two beams is formed as a hologram on a recording material. The recording material is typically made of a substance such as a single crystal of BSO or BGO which is capable of real-time recording. The recording material, when subsequently illuminated by a coherent beam that is introduced in the same direction as the original reference beam, reconstructs the image of the object. This recording method enables the technician to make an extremely precise measurement of the slightest deformation occurring in an object.

The holographic apparatus typically includes half mirrors for splitting a laser light into two beams and mirrors for reflecting and guiding the beams. Since the interference pattern is formed by the difference in the length of the path of each optical axis, it is necessary to strictly control this length as well as the setup angle of each mirror. Thus, a dislocation or vibration in the order of a wavelength of light would render the recording of the desired hologram impossible.

In order to meet these requirements, the holographic apparatus is typically set up on a large heavy table which is made of an iron block measuring 1500 mm long, 700 mm wide and several millimeters thick. The laser is directly placed on the iron table, and the lenses, mirrors and recording material are fixed on the table by respective magnet stands. The iron table is elastically supported by tires or springs which insulate the table against the effects of external vibration and impact. In some models, instead of using one magnet stand for each component, the lenses and prisms are put in an enclosure which is fixed onto the iron table. In either case, the entire holographic apparatus has to be installed on the large heavy table which typically weighs as must as 100 kg. The massiveness of the holographic apparatus is the primary reason why the system is still utilized only at a laboratory level. In addition, this holographic apparatus is far from being a consistent and reliable optical system; specifically, since the spatial arrangement of discrete optical components is vulnerable to vibrations or other accidental dislocation, the holographic apparatus would be virtually inoperable outside a highly controlled laboratory environment. These problems are common to other image processing systems such as those involving Fourier transform and video correlation.

SUMMARY OF THE INVENTION

Therefore, an object of the present invention is to provide an optical system that is small and lightweight, and which achieves consistent and reliable image processing.

It is another object of the invention to provide a holographic apparatus in which the mirrors and the recording material are both small in size and are held at predetermined distances and setup angles such that the coherent laser beam is directed to a desired point by the use of relatively few mirrors and the reconstructed hologram can be easily viewed.

These and other objects of the invention are realized by an apparatus which comprises a single unit of glass blocks bonded together to work as lenses or mirrors. Other optical components (such as optical fibers for transmitting both the source beams and the image beams) are fitted in corresponding photo-etched recesses of a substrate along with the glass block unit. The entire assembly is embedded in a transparent molding material.

BRIEF DESCRIPTION OF THE DRAWINGS

The structures and operations of the invention will become more apparent upon a detailed description of the preferred embodiments thereof. In the description to follow, reference will be made to the accompanying drawings, in which.

DETAILED DESCRIPTION OF THE PREFERRED EMBODIMENTS

Figure 1:
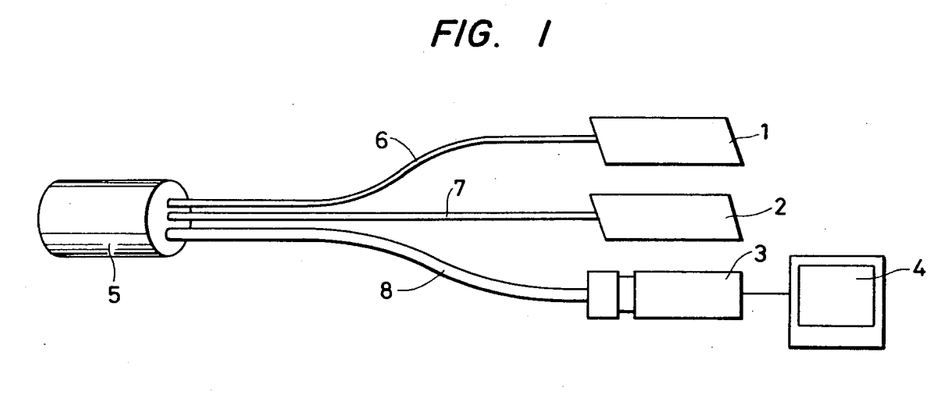
FIG. 1 is a schematic diagram of an optical deformation measuring apparatus using an optical system incorporating the concept of the present invention.

The apparatus shown in FIG. 1 includes an argon (Ar) laser 1 as a write-in light source, a helium-neon (He-Ne) laser 2 as a read-out light source, a television (TV) camera 3, a TV receiving set 4, and a holographic deformation measuring optical system 5. The selection of particular laser types is for illustrative purposes only (i.e. not by way of limitation). Both the Ar laser 1 and the He-Ne laser 2 are connected to the optical system 5 by a single-mode optical fibers 6 and 7, respectively. The TV camera 3 is connected to the optical system 5 by an image fiber 8.

Figure 2:
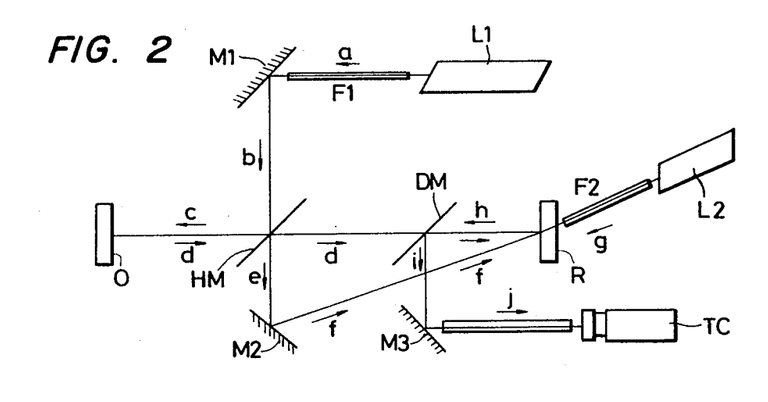
FIG. 2 is a schematic diagram of the interior of a holographic optical system for deformation measurement wherein a hologram is prepared by the double-exposure method.

The optical system shown in FIG. 1 is used to measure deformations by double-exposure holography using a single crystal of $Bi_{12}SiO_{20}$ (BSO element) as a recording material. The component configuration of this optical system, as shown in FIG. 2, is known in the art. For writing information into and reading it out of the recording material, two separate lasers having different wavelengths are used; for example, an Ar laser is used as a write-in light source and a He-Ne laser is used as a readout light source.

For a better understanding of the present invention, the well known principle of double-exposure photography is described below with reference to FIG. 2. Light (beam a) from a write-in laser L1 passes through the single-mode optical fiber F1 and is received at the terminating end thereof as a somewhat spread beam. Such a beam is reflected by a first mirror M1 and strikes a half mirror HM as a spread beam b. The half mirror HM divides the beam b into two beams c and e. The beam c is reflected from the half mirror HM and strikes the object O to be recorded. The beam c is reflected by the object O and is returned as the object beam (beam d) which carries the three-dimensional information on the profile of the object O. The beam d is transmitted through the half mirror HM and a dichroic mirror DM successively, and strikes a recording material R perpendicularly. The dichroic mirror DM has selective reflectance such that it transmits the light from the write-in laser L1 and reflects the light from a read-out laser L2. The recording material R is made of a conductive substance having real-time characteristics such as a single crystal of $Bi_{12}SiO_{20}$ (BSO element) or $Bi_{12}GeO_{20}$ (BGO element). One great advantage of such material is that, unlike a photographic plate, it need not be developed; that is, information can be read out as soon as it is written in.

The beam e, which is the other component of the beam b, is transmitted through the half mirror HM and is reflected by a second mirror M2 to form a beam f which operates as the reference beam. The object beam (beam d) and the reference beam (beam f) strike the recording material R at different angles. Since the light from the write-in laser L1 is coherent, an interference pattern is formed in the recording material R according to the contour of the object O. The interference pattern in a BSO or BGO element is the result of a non-uniform distribution of the electron cloud therein. By following this procedure for a write-in mode, two holograms are formed in the recording material R; one hologram carries information indicative of the object before deformation, and the other hologram carries information indicative of the object after deformation.

The recorded information is read out from the holographic plate R in the following manner. A read-out laser L2 produces light which has a longer wavelength than that of the write-in laser L1. A beam g from the read-out laser L2 passes through the single-mode optical fiber F2. After the beam diameter of beam g is increased, it is introduced from the rear of the recording material R substantially along the optical line of the reference beam f. A beam h is formed which travels in a direction opposite the object beam d. Beam h forms the real image of the object O at its original position. Before reaching this position, the beam h is reflected by the dichroic mirror DM to form a beam i. The beam i is reflected by a third mirror M3 to produce a beam j which is transmitted over an image fiber F3 and picked up by a television camera TC. The beam j is a reconstructed light beam carrying the information of the two real images of the object O. The real image of the deformed object has interference fringes of a density which is proportional to the amount of deformation.

Thus, by viewing the interference fringes on a CRT, both the location and amount of the deformation can be directly determined. The image of the object O picked up by the TC may be processed by any method (for example, instead of visual observation, the density of the interference fringes may be counted for automatic quantitative analysis of the deformation).

According to the present invention, optical components such as mirrors, half mirrors, dichroic mirrors and recording material are not combined as discrete devices, but are composed of prismatic glass blocks bonded together with interposing metallized surfaces between some blocks. The glass blocks are combined to form a single unit which is easy to handle and relatively small in size. This block unit, as well as the other necessary lenses and mirrors, is fitted into recesses in a substrate which are patterned to enable accurate registering of the respective optical components. The block unit and other optical devices on the substrate are then embedded in a transparent molding material to protect the entire optical system from external shock.

Figure 4:
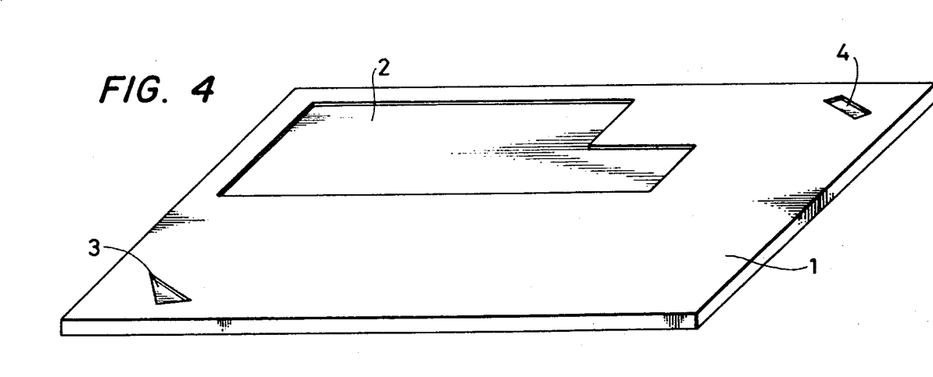
FIG. 4 is a perspective view of the substrate used in the system of FIG. 3.

As shown in FIG. 4, the optical system of the present invention is set up on a small, thin substrate 1 made of glass, metal or ceramic.

As shown in its perspective view of FIG. 4, the substrate 1 has recesses 2, 3 and 4. The recess 2 has a size and shape just large enough to receive the bottom of a composite block 5. The recesses 3 and 4 are shaped to receive the bottoms of a mirror block 6 and a glass block 7, respectively. In other words, the substrate 1 has recesses which have various shapes and sizes that conform to all the blocks to be fixed to the substrate. These recesses may be formed by any suitable method (such as photo-etching). If the substrate is made of glass or metal, recesses having exact dimensions can be formed by photo-etching. Any mechanical cutting method can also be used. The depth of the recesses is not critical for the purposes of the present invention. A ceramic substrate with recesses can be made by making predetermined recesses in the ceramic material before it is molded and baked.

Figure 3:
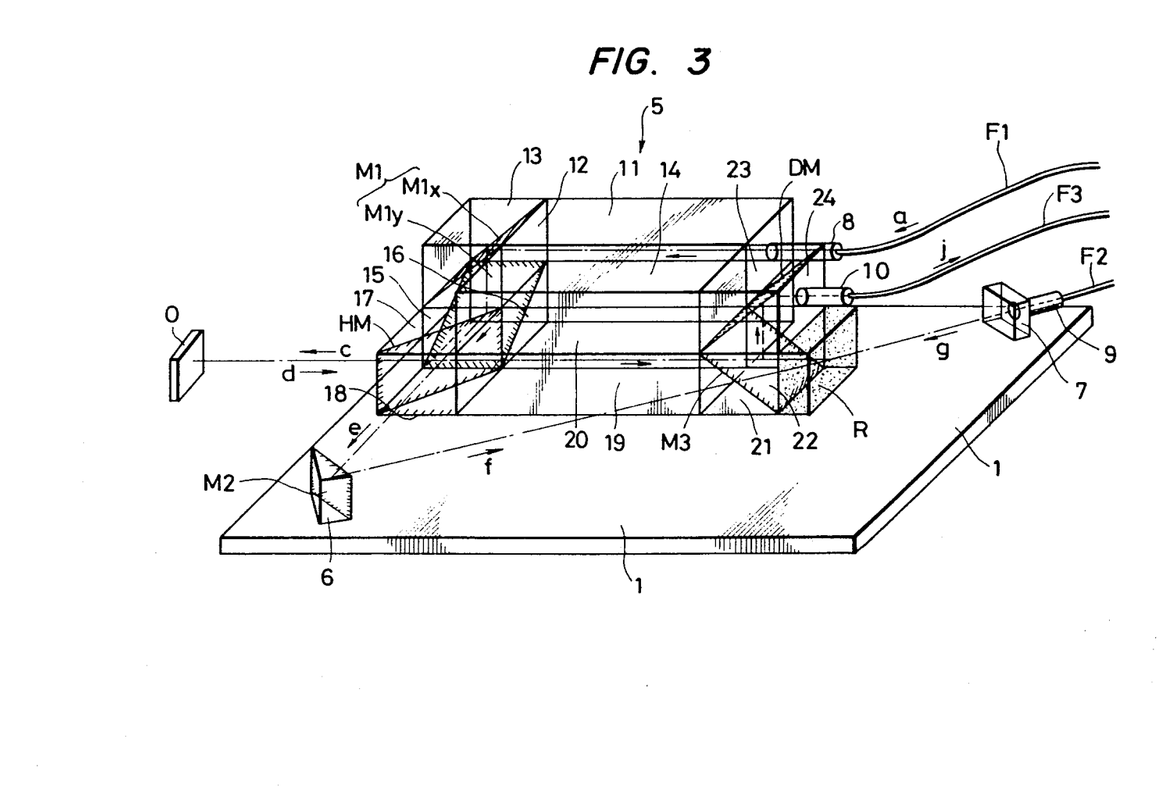
FIG. 3 is a perspective view of the glass block configuration according to one embodiment of the present invention which corresponds to the optical system of FIG. 2.

In FIG. 3, the single-mode fiber F1 for transmitting the light from the write-in laser L1 is connected to a rod lens 8. The rod lens 8 is a cylindrical lens having a distribution of refractive indices. Rod lens 8 thus is capable of expanding the fine beam from the laser L1 into parallel beams of a larger diameter. The single-mode fiber F2 for transmitting the light from the read-out laser L2 is connected to a rod lens 9. The rod lens 9 is supported by the glass block 7 which is fixed to the substrate 1. The image fiber F3 (through which the reconstructed light is transmitted to the television camera TC) is connected to a rod lens 10 which forms the real image of the object O at the other end of the image fiber F3. The complex block 5 comprises unit glass blocks of the proper shape which are bonded together by an adhesive with or without metallized mirror surfaces formed at their respective interfaces.

The rod lens 8 for introducing the write-in light is bonded to one end of a transparent first unit block 11. The first unit block 11 is in the form of a rectangular prism. The write-in beam a, passing through the first block 11, enters a second unit block 12. The second unit block 12 and a third unit block 13 are each in the form of a triangular prism having an equilateral, right-angled triangular base. A vapor-deposited metal coating is formed on the diagonal oblique plane of either block (12 or 13) to form a first mirror M1x at the interface of the two blocks. The two blocks are bonded together by an epoxy resin adhesive, balsam or any other suitable adhesive.

Directly under the second unit block 12 are provided a fifth unit block 15 and a sixth unit block 16 which are each in the form of a triangular prism and are bonded together with an intervening first mirror M1y. The mirrors M1x and M1y are in a twisted relation and are combined to form the first mirror M1 of FIG. 2.

A fourth unit block 14 is a glass block of the same shape and size as that of the first unit block 11. The top of the fourth unit block is bonded to the first unit block, and one of its sides is bonded to the fifth unit block 15 and sixth unit block 16. The function of the fourth unit block is not to transmit light; rather, the fourth unit block acts as an intermediary for connecting the first, fifth and sixth unit blocks. Such intermediary blocks are necessary for building up the integrated composite block 5.

One side of the fifth unit block 15 is bonded to one side of a seventh unit block 17 in the form of a triangular prism which is combined with an equally triangular prismatic eighth unit block 18 to form a rectangular prism. The diagonal oblique plane of either block 17 or block 18 has a metallized surface to provide a half mirror HM. One of the equal planes of the eighth unit block 18 which is parallel to the beam e forms the outer wall of the composite block 5, and the mirror block 6 is spaced from block 5 in a direction normal to that plane. The object O is positioned on the extension of the normal to the outwardly facing vertical face of the unit block 17 which is parallel to the beam c.

In operation, the beam b is divided by the half mirror HM into two beams c and e which diverge at a right angle. The beam c illuminates the object O, whereas the beam e strikes the second mirror M2 on the mirror block 6. The beam d (object beam) reflected from the object O returns to the seventh unit block 17 and goes straight through the half mirror HM to strike a ninth unit block 19 which is a rectangular prism of the same shape and size as that of the first unit block 11 or fourth unit block 14. The object beam d is transmitted through the ninth unit block 19 in the longitudinal direction.

A tenth unit block 20 is a glass block in the form of a rectangular prism which is bonded to the top of the ninth unit block 19. This block does not receive light, and its function is to reinforce the block assembly. An eleventh unit block 21 is bonded to the oblique end of the ninth unit block 19 which, like a twelfth unit block 22, is a triangular prism. The oblique diagonal plane of either block (21 or 22) is provided with a metallized surface which works as a dichroic mirror DM. A recording material R having real-time characteristics is bonded to the vertical plane of the twelfth unit block 22. The recording material is typically made of a BSO or BGO element. The top of the twelfth unit block 22 and the back end of the tenth unit block 20 are bonded to a thirteenth unit block 23 and a fourteenth unit block 24, both being in the form of a triangular prism. The diagonal oblique plane of either block (23 or 24) is vapor-deposited with a metal to provide a third mirror M3. The rod lens 10 is bonded to the open end of the fourteenth unit block 24.

In operation, the reference beam f strikes the front side of recording material R and the read-out beam g strikes the rear side of the recording material R. Beams f and g are not introduced in completely opposite directions since they have different wavelengths. Specifically, angle of incidence of each beam must be determined such that Bragg's condition of reflection is satisfied (i.e. the ratio of (a) the cosine of the angle between the reference beam and a plane normal to the surface of the recording material to (b) the cosine of the angle between the object beam and the plane normal to the surface of the recording material must be equal to the ratio of the wavelengths of the two beams). This requirement is fairly difficult to meet. However, once the Bragg angle is determined, the recording material R, mirror block M2 and glass block 7 can be placed into preformed recesses 2, 3 and 4, respectively in the substrate 1 without the need for subsequent fine adjustment.

Figure 5:
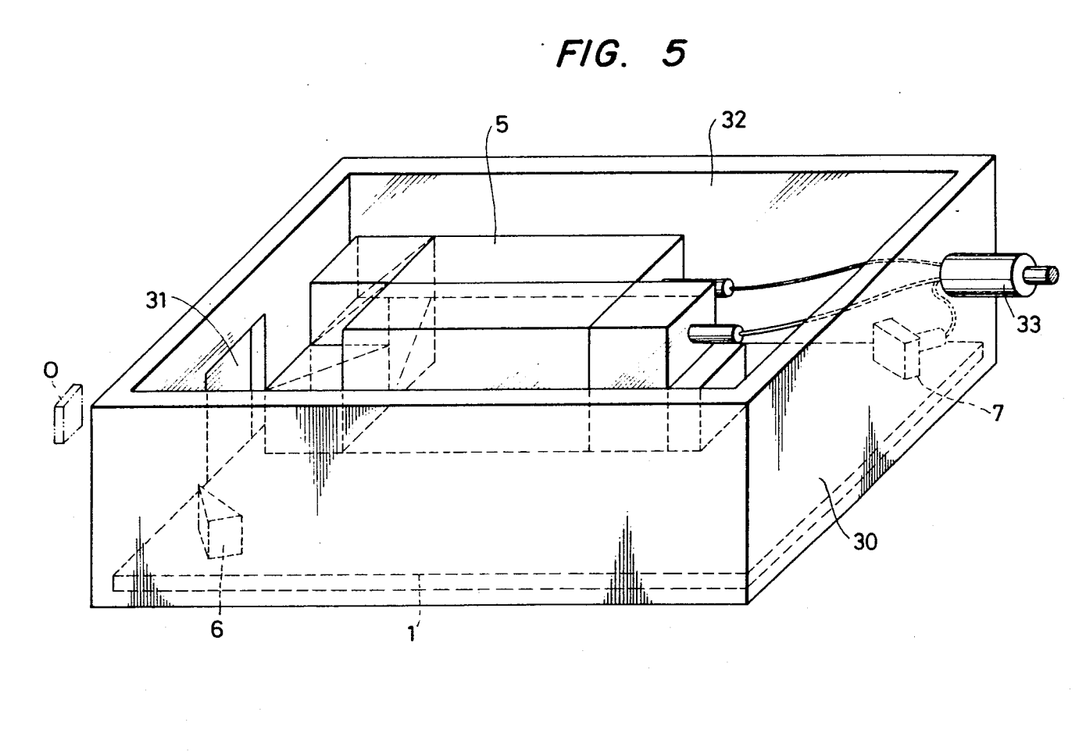
FIG. 5 is a perspective view of the optical system of FIG. 3 as packaged and molded.

The composite glass block 5, mirror block 6 and glass block 7 positioned on the substrate 1 are than embedded in a transparent molding material, as shown in the perspective view of FIG. 5. In the embodiment shown in FIG. 5, the optical system of FIG. 1 is packaged in a box-type enclosure 30 which is embedded in a transparent thermoplastic resin material. A window 31 is made in the front face of the enclosure 30. The object to be recorded is placed in front of the window 31. The substrate 1, composite block 5, mirror block 6 and glass block 7 are confined within the molding 32 and they are firmly bound to each other by the transparent solid layer of the molding material (which should be purified so that no air or other deleterious material is contained therein). The single-mode fibers F1 and F2, as well as the image fiber F3, can be individually connected to the elements outside the enclosure. In the illustrated embodiment, however, the fibers F1–F3 share a common connector 33. The preferred molding resin is one which has both a coefficient of thermal expansion approximately equal to that of the substrate and glass and a refractive index near that of glass. The purposes achieved by embedding the optical system in a molding are two-fold: to provide a rugged combination of the individual optical blocks, and to prevent light reflection from the glass blocks. In one embodiment, the glass blocks are made of borosilicate crown glass (BK 7) having a refractive index n of 1.51 and the molding material is polymethylmethacrylate (PMMA) with $n=1.49$.

The optical system of the present invention may be put to use as shown in FIG. 5, but if necessary, it may be closed with a cover. The enclosure 30 and the cover may be made of any material such as metals, plastics and glass. Packaging with the enclosure 30 is not critical to the present invention. If no package is used, the optical system is placed in a suitable mold which is filled with a molten resin. After the resin solidifies, the entire molding can be immediately put to service. The mirrors M1, M2, M3, . . . may be formed by vapor deposition of a suitable metal such as aluminum. The dichroic mirror DM can be made by vapor deposition of oxides such as $TiO_2$, $CeO_2$ and $SiO_2$. Typically, an Ar laser is used as the write-in laser L1, and a He-Ne laser as the read out laser L2. The foregoing description assumes that the optical system of the present invention is used to measure the deformation of an object by double-exposure holography, but it should be understood that the invention can provide a deformation measuring system making use of real-time holography.

Figure 6:
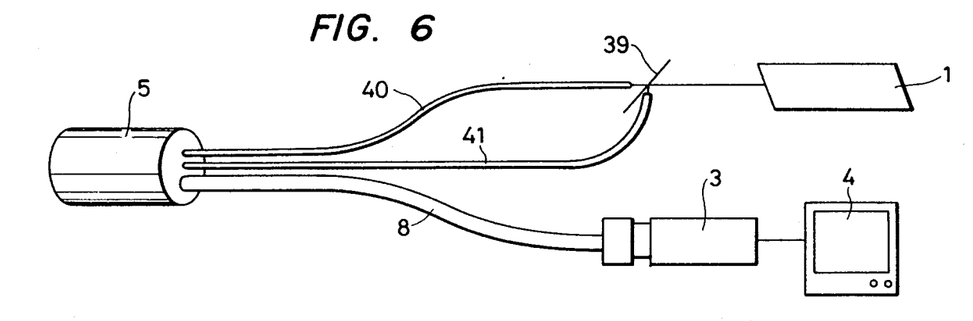
FIG. 6 is a schematic diagram showing the general view of an optical deformation measuring apparatus using phase-conjugate holography.

FIG. 6 is a schematic diagram showing the general view of an optical deformation measuring apparatus according to another embodiment of the present invention using phase-conjugate holography. In FIG. 6, the light from the Ar laser 1 is split into two beams by a beam splitter 39. The two beams are transmitted to a holographic deformation measuring device 5 through single-mode optical fibers 40 and 41, respectively.

Figure 7:
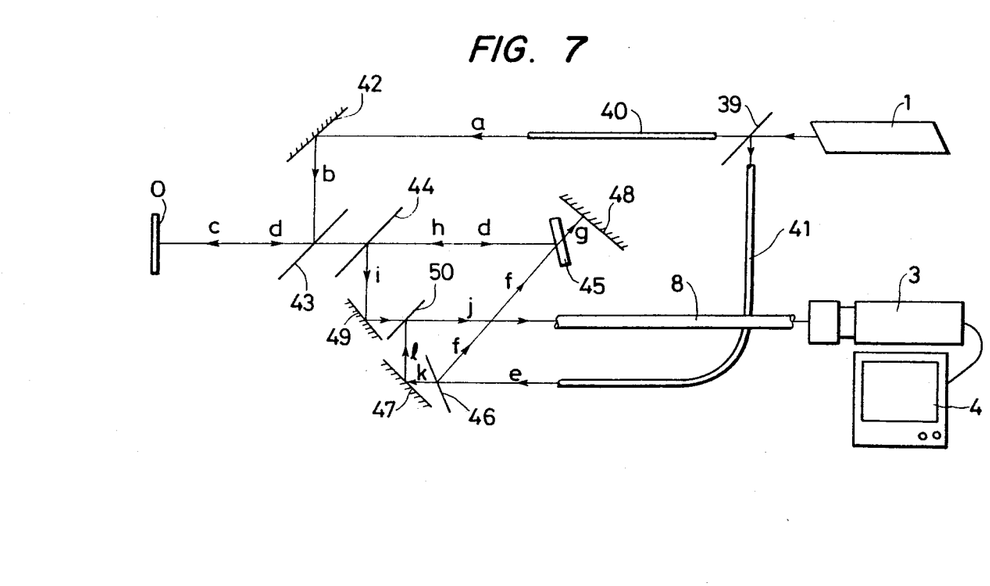
FIG. 7 is an embodiment of the optical system configuration for producing a phase conjugate hologram.

An embodiment of the optical system configuration for producing a phase conjugate hologram is shown in FIG. 7. The light beam a from the Ar laser 1 is reflected from a first mirror 42 and travels as a beam b. The beam b is reflected by a first half mirror 43 and strikes the object O as a beam c. The beam c is reflected from the object O and is sent back as a beam d (the object beam) which is transmitted through both the first half mirror 43 and a second half mirror 44 to reach a recording material 45. Beam e from the Ar laser 1 passes through a collimator system (not shown) and the resulting beam of parallel rays is reflected by a third half mirror 46 and strikes the recording material 45 as a beam f. The object beam d and reference beam f strike the recording material 45 at different angles of incidence, so an interference pattern is produced which is recorded on the recording material.

In the read-out mode, the reference beam f is reflected from a third mirror 48 and is sent back in the reverse direction as a read-out beam g. The reference beam f and read-out beam g travel in opposite directions and strike the recording material 45. Since the reference beam f and read-out beam g strike the recording material simultaneously but in opposite directions, a beam h is produced having a wave number vector in a direction opposite that of the object beam d. The beam h forms the conjugate real image of the object O in its original position. The beam h is reflected by the half mirror 44 and forms a beam i, which is reflected by a mirror 49 and is transmitted through a half mirror 50 to form a beam j. The beam j interferes with a beam k (which is that component of beam e which has been transmitted through the half mirror 46) and an interference pattern is formed. Since the beam k is a planar wave, the resulting interference pattern represents the deformation of the object O. The pattern is transmitted over the image fiber 8, to a TV camera 3 and is displayed on the CRT of the TV receiving set 4.

Figure 8:
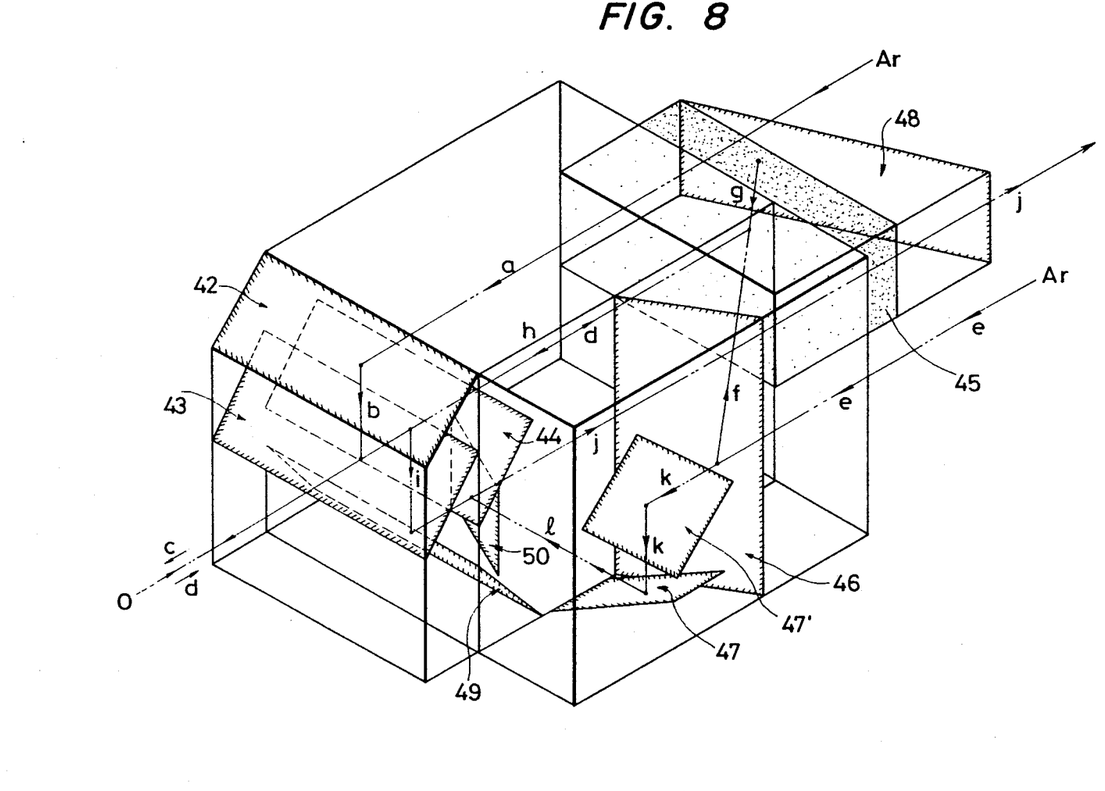
FIG. 8 is a perspective view of the glass block configuration according to a second embodiment of the present invention which corresponds to the optical system of FIG. 7.

FIG. 8 is a perspective view of the glass block configuration according a second embodiment of the present invention which corresponds to the optical system of FIG. 7, wherein like components including mirrors, half mirrors and beams are identified by like symbols and reference numerals. The optical system may be divided into a desired number of glass blocks as described previously.

As previously described, in a conventional holographic system the optical components are positioned on a massive iron table. According to the present invention, on the other hand, the respective optical components are formed in a plurality of glass blocks which are bonded together into a composite block. This composite block, along with any functional blocks which cannot be so combined, are positioned in preformed recesses in a substrate. All the devices mounted on the substrate are then embedded in a thermo-plastic molding resin. The resulting optical system is lightweight and small. The composite block 5 measures (in the preferred embodiment) only about 10 mm × 10 mm × 50 mm. Its small size, light weight and the consequent ease of handling renders the optical system of the invention applicable to a wide range of uses such as the measurement of deformations in IC chips and the thickness of films being passivated. The recesses in the substrate can be formed not only by photo-etching but also by chemical etching, plasma etching and ion-beam etching. In the embodiments described above, the substrate has three recesses, but it may have as many recesses as are required to receive the optical components (glass blocks) which are spaced from each other.

Further, by being integrated into a unit, the individual components of the invention have a fixed positional relationship and can readily satisfy the requirement in holography that any misalignment or dislocation should be less than an eighth of the wavelength of a light beam. Finally, since the unit of glass blocks is connected to the light source (i.e. lasers) by optical fibers and the image output is transmitted through an image fiber, the deformation measuring instrument has a greater tolerance for installation.

In the embodiments described above, only the mirrors, half mirrors and dichroic mirror are made of glass blocks. However, it is to be understood that other optical components may be made of glass blocks. If a large object is to be recorded, the laser beam transmitted through a single mode fiber must be enlarged by combining two or more lenses, and in this case, the lenses may be fixed by bonding to the necessary glass blocks. If the lenses are made of a material having a refractive index different from that of the glass blocks, the former may be effectively incorporated in the latter. Needless to say, a concave mirror or convex mirror may also be buried in the glass blocks. While the foregoing description relates to a holographic deformation measuring optical system, the present invention can also be applied to other image processing optical systems, such as those involving the Fourier transform, spatial frequency filtering and video correlation.

What is claimed is:

1. An optical system, comprising
    a plurality of multi-surfaced transparent unit blocks, at least one of said unit blocks having light reflective material deposited on a surface thereof and at least another of said unit blocks being composed of a photosensitive material;
    bonding means for securing together at least two of said unit blocks in a predetermined fashion; and
    mounting means for mounting said unit blocks.

2. The optical system as recited in claim 1, wherein said unit blocks are embedded in a transparent coating material to form an optical system block.

3. The optical system as recited in claim 2, further comprising light transmission means for transmitting light between a light source outside said optical system block and selected ones of said plurality of unit blocks.

4. The optical system as recited in claim 2, wherein said unit blocks mounted on said mounting means and said mounting means are encased in a casing and coated with said transparent coating material.

5. The optical system as recited in claim 4, wherein said casing has a window formed therein for the reception of light reflected by an object.

6. A method of manufacturing an optical system, said method comprising the steps of:
    forming at least two multi-surfaced transparent unit blocks, at least one of said unit blocks being composed of a photosensitive material;
    coating at least one of said surfaces of one of said unit blocks with a light reflective material;
    securing at least two of said unit blocks together in a predetermined fashion; and mounting said unit blocks on a common mounting means.

7. The method of manufacturing an optical system as recited in claim 6, further comprising
embedding said unit blocks mounted on said mounting means and said mounting means in a transparent coating material to form an optical system block.

8. The method of manufacturing an optical system as recited in claim 6, wherein said photosensitive material consists of one of the compounds selected from the group comprising $Bi_{12}SiO_{20}$ and $Bi_{12}GeO_{20}$.

9. The method of manufacturing an optical system as recited in claim 6, wherein said step of coating at least one of said surfaces of one of said unit blocks comprises a vapor deposition of a light reflective material.

10. An optical system as recited in claim 1, wherein said mounting means has recesses formed therein formed by photo-etching, said unit blocks being disposed within said recesses.

11. An optical system as recited in claim 1, wherein at least one of said unit blocks comprises a rectangular prism.

12. An optical system as recited in claim 1, wherein at least one of said unit blocks comprises a triangular prism.

13. An optical system as recited in claim 1, wherein said unit blocks secured together comprise a composite block, and wherein at least one of said unit blocks comprises a mirror block disposed on said mounting means in a facing relationship with respect to said composite block.

14. The optical system as recited in claim 11, wherein one of said unit blocks comprises a light transmission block disposed on said mounting means in a facing relationship with respect to both of said first mirror block and said composite block, said light transmission block being connected to a source of light.

15. A holographic optical system, comprising:
a support means;
first and second rectangular prism blocks mounted on said support means, each of said rectangular prism blocks comprising first and second short sides and first, second, third and fourth long sides, said third long side of said first rectangular prism being bonded by a bonding means to said first long side of said second rectangular prism;
third and fourth rectangular prism blocks, each comprising first and second short sides and first, second, third and fourth long sides, said third long side of said third rectangular prism being bonded by a bonding means to said first long side of said fourth rectangular prism, said fourth long side of said third rectangular prism being bonded by a bonding means to said second long side of said first rectangular prism, and said fourth long side of said fourth rectangular prism being bonded by a bonding means to said second long side of said second rectangular prism;
first and second triangular prism blocks, each comprising a long side, first and second short sides and first and second end sides, at least one of said long sides of said first and second triangular prisms being coated with a light reflective material to form a first mirror, said long sides being bonded by a bonding means to form a fifth rectangular prism block, said second short side of said first triangular prism being bonded by a bonding means to said second short side of said third rectangular prism;
third and fourth triangular prism blocks, each comprising a long side, first and second short sides and first and second end sides, at least one of said long sides of said third and fourth triangular prisms being coated with a light reflective material to form a second mirror, said long sides being bonded by a bonding means to form a sixth rectangular prism block, said first short side of said third triangular prism being bonded by a bonding means to said first short side of said second triangular prism, and both of said first end side of said fourth triangular prism and said second end side of said third rectangular prism being bonded by a bonding means to said second short side of said first rectangular prism, said fourth triangular prism being mounted on said support means;
fifth and sixth triangular prism blocks mounted on said support means, each of said fifth and sixth triangular prism blocks comprising a long side, first and second short sides and first and second end sides, said long side of at least one of said fifth and sixth triangular blocks being coated with a light reflective material to form a half mirror, said long sides of said fifth and sixth triangular blocks being bonded by a bonding means to form a seventh rectangular prism block, said second short side of said fifth triangular block being bonded by a bonding means to said second short side of said third triangular block, and said first short side of the sixth rectangular block being bonded by a bonding means to said second short side of said second rectangular prism;
seventh and eighth triangular prism blocks, each comprising a long side, first and second short sides and first and second end sides, at least one of said long sides of said seventh and eighth triangular prisms being coated with a light reflective material to form a dichroic mirror, said long sides being bonded by a bonding means to form an eighth rectangular prism block, said first short side of said seventh triangular prism being bonded by a bonding means to said first short side of said fourth rectangular prism; and
ninth and tenth triangular prism blocks, each comprising a long side, first and second short sides and first and second end sides, at least one of said long sides of said ninth and tenth triangular prisms being coated by a light reflective material to form a third mirror, said long sides of said ninth and tenth triangular prisms being bonded to form a ninth rectangular prism, said first short side of said ninth triangular prism being bonded by a bonding means to said first short side of said eighth triangular prism, said second short side of said tenth triangular prism being bonded by a bonding means to said first short side of said second rectangular prism, said tenth triangular prism being mounted on said support means; and
a recording block composed of a photosensitive material, said recording block being mounted on said support means and bonded by a bonding means to said second short side of said ninth triangular prism.

16. The holographic optical system as in claim 15, further comprising
first and second light sources and a display means;

an eleventh triangular prism block mounted on said support means, said triangular prism block having a long side with a light reflective material coated thereon, first and second short sides and first and second end sides, said long side of said eleventh triangular prism defining an optical path between said half mirror and said third mirror;

a light source support block mounted on said support means, said support block defining an optical path between said first light source and said third mirror, said support block being disposed in parallel with respect to said long side of said eleventh triangular prism;

a first connecting means for connecting said first light source to said light source support block;

a second connecting means for connecting said second light source to said first short side of said third rectangular prism; and a third connecting means for connecting said display means to said second short side of said eighth triangular prism block;

said light-sensitive recording block recording a hologram of an object disposed in a facing relationship with respect to said first short side of said fifth triangular prism block.

* * * * *